US006987918B1

(12) United States Patent
Bickham

(10) Patent No.: US 6,987,918 B1
(45) Date of Patent: Jan. 17, 2006

(54) LARGE KAPPA DISPERSION COMPENSATING FIBER AND TRANSMISSION SYSTEM

(75) Inventor: Scott R. Bickham, Corning, NY (US)

(73) Assignee: Corning Incorporated, Corning, NY (US)

(*) Notice: Subject to any disclaimer, the term of this patent is extended or adjusted under 35 U.S.C. 154(b) by 36 days.

(21) Appl. No.: 10/875,899

(22) Filed: Jun. 24, 2004

(51) Int. Cl.
G02B 6/02 (2006.01)
G02B 6/22 (2006.01)

(52) U.S. Cl. .................. 385/127; 385/123; 385/126
(58) Field of Classification Search .............. None
See application file for complete search history.

(56) References Cited

U.S. PATENT DOCUMENTS

| 5,361,319 | A | 11/1994 | Antos et al. ............... 385/123 |
| 6,597,848 | B1 | 7/2003 | Berkey et al. ............. 385/124 |
| 6,888,993 | B2 * | 5/2005 | Zhang ........................ 385/127 |
| 2003/0021562 | A1 | 1/2003 | Kumano ..................... 385/123 |
| 2003/0053780 | A1 | 3/2003 | Zhang ........................ 385/127 |
| 2004/0008958 | A1 | 1/2004 | Bickham .................... 385/124 |
| 2004/0174987 | A1 | 9/2004 | Bickham et al. ........... 385/127 |
| 2005/0063655 | A1 * | 3/2005 | Hebgen et al. ............. 385/124 |
| 2005/0094955 | A1 * | 5/2005 | Bickham .................... 385/127 |

OTHER PUBLICATIONS

Mishra, et al., "High Figure of Merit Dispersion Compensating Fiber for Standard Single Mode Fiber and Transmission System Utilizing Same", filed Sep. 24, 2003, U.S. Appl. No. 10/670,017.

Bickham, "Dispersion Compensating Fiber for Moderate Dispersion NZDSF and Transmission System Utilizing Same", filed Oct. 30, 2003, U.S. Appl. No. 10/696,929.
Bickham, et al., "Dispersion Flattened NZDSF Fiber", filed Dec. 31, 2002, U.S. Appl. No. 10/731,601.
Molin, et al., "Ultra-Low Slope Medium-Dispersion Fiber for Wide-Band Transmissions", OFC 2003, Tuesday Afternoon, vol. 2, pps. 150-151.

* cited by examiner

Primary Examiner—Brian Healy
Assistant Examiner—Derek L. Dupuis
(74) Attorney, Agent, or Firm—Randall S. Wayland

(57) ABSTRACT

A dispersion compensation fiber for a moderate dispersion, low slope transmission fiber and transmission system including same. The dispersion compensating fiber has a refractive index profile having a central core with a core delta ($\Delta 1$), a moat surrounding the central core having a moat delta ($\Delta 2$), and a ring surrounding the moat having a positive ring delta ($\Delta 3$). The fiber's refractive index profile is selected to provide total dispersion less than −80 at 1550 nm and less than −90 ps/nm/km at 1600 nm, dispersion slope less than −0.18 ps/nm$^2$/km at 1550 and less than −0.10 ps/nm$^2$/km at 1600 nm/kappa between 250 and 450 at 1550 nm, and a kappa ratio (defined as kappa at 1600 nm/kappa at 1550 nm) of greater than 1.35. The dispersion compensating fiber, when used in a transmission system, may provide low average residual dispersion across the C, L, and C+L bands when such systems include moderate dispersion, low dispersion slope transmission fibers with a total dispersion between 4 and 8 ps/nm/km, and a dispersion slope less than 0.025 ps/nm$^2$/km at all wavelengths between 1525 and 1625 nm.

19 Claims, 9 Drawing Sheets

LARGE KAPPA DISPERSION COMPENSATING FIBER AND TRANSMISSION SYSTEM

BACKGROUND OF THE INVENTION

1. Field of the Invention

The present invention relates generally to optical fiber, and more particularly to dispersion compensation fiber and transmission systems including coupled combinations of transmission fiber and dispersion compensation fiber.

2. Technical Background

Higher data rates and wider bandwidth systems are becoming needed for the telecommunications industry. Thus, the search for high performance optical fibers designed for long distance, high bit rate telecommunications that operate over broad bandwidths has intensified. These high data rates and broad bandwidths, however, have penalties associated with them. In particular, dispersion is a significant problem in such systems. More specifically, positive dispersion builds along the length of the high data rate transmission fiber. Dispersion compensating fibers included in cable or in dispersion compensation modules have been designed that compensate for such dispersion. These fibers generally have negative dispersion slope and negative total dispersion within the operating wavelength band, with the dispersion having a large negative value such that a short length of the dispersion compensating fiber compensates for the positive dispersion and positive slope of the longer transmission portion. In operation, the bend performance (both macro-bending and micro-bending) and other properties, such as dispersion, kappa (kappa being the ratio of total dispersion divided by dispersion slope at a specific wavelength), cutoff wavelength and effective area of the dispersion compensating fiber are important and generally competing criteria.

A class of transmission fibers that have utility in transmission systems has been developed recently, such fibers being generally referred to herein as moderate dispersion, low dispersion slope fibers (MDLDSF). In particular, U.S. Pat. App. No. 60/437,291 filed Dec. 31, 2002 describes one such MDLDSF. In particular, such fibers have dispersions between about 4 and 8 ps/nm/km at 1550 nm, and dispersion slope of less than 0.025 ps/nm$^2$/km for all wavelengths between about 1525 and 1625 nm.

Thus, there is a need for a dispersion compensating fiber which: (1) exhibits desired properties over a desired wavelength range, (2) retains high performance optical fiber characteristics such as high strength, low attenuation, acceptable resistance to micro- and macro-bend induced loss, and sufficient effective area and cutoff wavelength, and (3) is particularly effective at compensating for accumulated dispersion in systems utilizing such MDLDSF across the operating wavelength range such that relatively low average residual dispersion results in the system.

SUMMARY OF THE INVENTION

DEFINTIONS

The following definitions are used herein.

Refractive Index Profile—The refractive index profile is the relationship between relative refractive index and optical fiber radius (as measured from the fiber's centerline, CL) for the dispersion compensating fiber.

Segmented Core—A segmented core is one that has multiple segments in the physical core, such as a first and second segment (or a three segment physical core having a central core, a moat, and a ring, for example). Each core segment has a respective refractive index profile and a maximum and minimum refractive index therein.

Radii—As best shown in FIG. 3, the radii of the segments of the core 21 are defined in terms of the beginning and end points of the segments of the refractive index profile of the fiber 20. FIG. 3 best illustrates the definitions of radii $R_1$, $R_2$, and $R_3$ used herein. The same dimension conventions apply for defining the radii and deltas in the other refractive index profiles described herein in FIGS. 4–8. The outer radius, $R_1$, of the central core 22 is the length dimension that extends from the dispersion compensating fiber's centerline, CL, to the point at which the refractive index profile crosses the relative refractive index zero 23 (the zero measured relative to the cladding 28). The outer radius, $R_2$, of the moat segment 24 extends from the centerline, CL, to the radius point where the outer edge of the moat crosses the refractive index zero 23 (again measured relative to the cladding 28). The center radius, $R_3$, is measured to the radius point at the approximate center of the ring 26. In particular, $R_3$, is measured to the center point 27 of the half height dimension, Wh. The half height dimension is the width, Wh, measured across the ring at the position $\Delta 3/2$ (measured relative to the cladding 28).

Effective Area—The effective area is defined as:

$A_{eff} = 2\pi (\int E^2 \, r \, dr)^2 / (\int E^4 \, r \, dr)$, where the integration limits are 0 to $\infty$, r is the fiber radius, and E is the electric field associated with the propagated light as measured at 1550 nm.

$\Delta\%$ or Delta (%)—The term $\Delta\%$ or Delta (%) represents a relative measure of refractive index defined by the equation:

$$\Delta\% = 100(n_i^2 - n_c^2)/2n_i^2$$

where $n_i$ is the maximum refractive index (highest positive or lowest negative) in the respective region i (e.g., 22, 24, 26), unless otherwise specified, and $n_c$ is the refractive index of the cladding (e.g., 28) unless otherwise specified.

$\alpha$-profile—The term alpha profile, $\alpha$-profile refers to a refractive index profile of the central core 22, expressed in terms of $\Delta(b)\%$, where b is radius, which follows the equation, $$\Delta(b)\% = [\Delta(b_o)(1 - [|b - b_o|/(b_1 - b_o)]^\alpha)]100$$

where $b_o$ is the maximum point of the profile of the core and $b_1$ is the point at which $\Delta(b)\%$ is zero and b is in the range $b_i \leq b \leq b_f$, where $\Delta\%$ is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. In the model, in order to bring about a smooth joining of the $\alpha$-profile with the profile of the adjacent profile segment, the equation is rewritten as;

$$\Delta(b)\% = [\Delta(b_a) + [\Delta(b_o) - \Delta(b_a)]\{(1 - [|b - b_o|/(b_1 - b_o)]^\alpha)\}]100, \text{ where } b_a \text{ is the first point of the adjacent segment.}$$

Pin array macro-bending test—This test is used to compare the relative resistance of optical fibers to macro-bending. To perform this test, attenuation loss is first measured when the optical fiber is arranged such that no induced bending loss occurs. The optical fiber is then woven about a pin array and attenuation again measured. The loss induced by bending is the difference between the two attenuation measurements in dB. The pin array is a set of ten cylindrical pins arranged in a single row and held in a fixed vertical position on a flat surface. The pin spacing is 5 mm, center-to-center, and the pin diameter is 0.67 mm. During the test, the optical fiber is caused to pass on opposite sides of adjacent pins and is placed under a tension sufficient to make the optical fiber conform to a portion of the periphery of the pins.

Lateral load test—Another bend test referenced herein is the lateral load test that provides a measure of the microbending resistance of the optical fiber. In this test, a prescribed length of optical fiber is placed between two flat plates. A #70 wire mesh is attached to one of the plates. A known length of optical fiber is sandwiched between the plates and in contact with the mesh and the reference attenuation is measured while the plates are pressed together with a force of 30 newtons. A 70 newton force is then applied to the plates and the increase in attenuation in dB/m is measured. This increase in attenuation is the lateral load attenuation of the optical fiber.

In accordance with embodiments of the present invention, a dispersion compensating fiber is provided having a refractive index profile including a central core having a positive core delta ($\Delta 1\%$) and an outer radius (R1), a moat surrounding the central core having a negative moat delta ($\Delta 2\%$) and an moat outer radius (R2), and a ring surrounding the moat having a positive ring delta ($\Delta 3\%$), wherein the refractive index profile is selected to provide total dispersion less than $-80$ ps/nm/km at 1550 nm and less than $-90$ ps/nm/km at 1600 nm, dispersion slope less than $-0.18$ ps/nm$^2$/km at 1550 nm and less than $-0.1$ ps/nm$^2$/km at 1600 nm, and kappa, defined as the total dispersion divided by the dispersion slope at a specific wavelength, at 1550 nm being greater than 250 nm and less than 450 nm, and at 1600 nm being greater than the kappa at 1550 nm, and a kappa ratio, defined as kappa at 1600 nm divided by kappa at 1550 nm, greater than 1.35.

In accordance with further embodiments of the present invention, the total dispersion is preferably less than $-80$ and greater than $-130$ ps/nm/km at 1550 nm and the total dispersion at 1600 nm is preferably less than $-90$ and greater than $-145$ ps/nm/km. Dispersion slope for the fiber is preferably between $-0.18$ and $-0.40$ ps/nm$^2$/km at 1550 nm and between $-0.20$ and $-0.45$ ps/nm$^2$/km at 1600 nm. According to further preferred embodiments, kappa at 1550 nm is greater than 290 nm and less than 430 nm. Moreover, in the most preferred embodiments, the kappa ratio is between 1.45 and 1.65. Preferred embodiments exhibit effective areas of greater than or equal to 17 square microns at 1550 nm and pin array bend losses of less than 6 dB at 1550 nm.

In accordance with another embodiment of the invention, an optical transmission system is provided, wherein the dispersion compensation fiber as set forth above is optically coupled to a transmission fiber, the transmission fiber having a total dispersion between 4 and 8 ps/nm/km at 1550 nm, and a positive dispersion slope less than 0.025 ps/nm$^2$/km for all wavelengths between 1525 and 1625 nm. Most preferably, the transmission fiber also comprises a kappa, defined as total dispersion at 1550 nm divided by dispersion slope at 1550 nm, of greater than 200 nm. Accordingly, the optical transmission system preferably provides a High-to-Low residual dispersion over a wavelength band from 1525 nm to 1625 nm which is less than 8 ps/nm per 100 km of the transmission fiber.

The dispersion compensating fiber according to the invention has the advantage of having very high kappa. Also, such high kappa is achieved while preferably retaining high effective area (greater than or equal to 17 square microns at 1550 nm) and while preferably also retaining good bend loss properties. High effective area allows for less coupling loss, low nonlinearities, and reduced four wave mixing and cross phase modulation, and is thus desirable.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
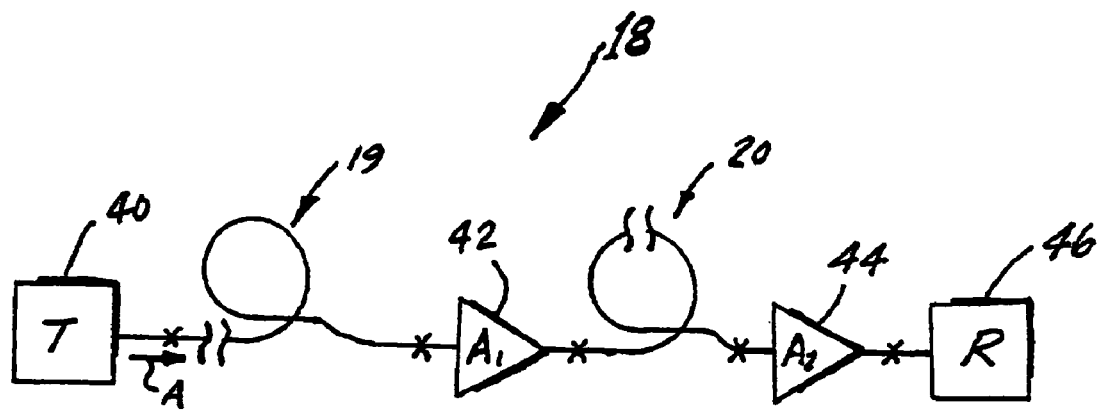
FIG. 1 is a block depiction of a transmission system including a dispersion compensating fiber in accordance with embodiments of the present invention.
Figure 2:
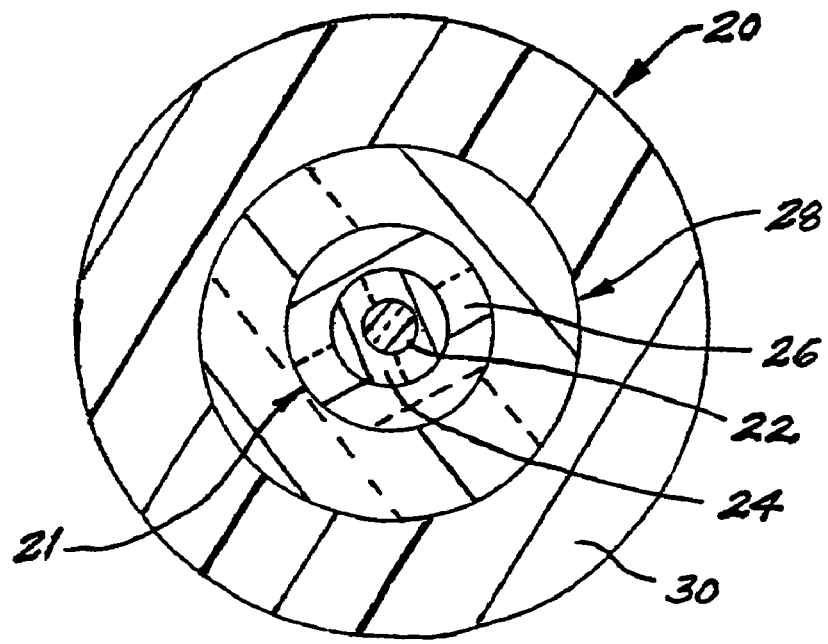
FIG. 2 is a representative cross-sectional end view the dispersion compensating fiber in accordance with embodiments of the present invention.

Reference will now be made in detail to the present preferred embodiment(s) of the invention, examples of which is/are illustrated in the accompanying drawings and tables. Whenever possible, the same or similar reference numerals will be used throughout the drawings to refer to the same or similar parts.

By way of example illustrating one aspect of the present invention, and not to be considered limiting, an optical transmission system 18 is provided as illustrated in FIG. 1. System 18 preferably includes a length (e.g., about 100 km) of a transmission fiber 19, such as the Moderate Dispersion, Low Dispersion Slope Fiber (MDLDSF) described above optically coupled to a dispersion compensating fiber 20 in accordance with embodiments of the invention. Several transmission fibers 19 which may be employed in the transmission system 18 have the refractive index profiles as shown and described with reference to FIGS. 13 and 14 herein. The transmission fiber 19 has a positive dispersion between about 4 and 8 ps/nm/km at 1550 nm, and a positive dispersion slope of less than about 0.025 ps/nm$^2$/km for all wavelengths between about 1525 and 1625 nm. Kappa of the MDLDSF 19 is preferably greater than about 200 nm at 1550 nm, and more preferably between about 250 nm and 450 nm at 1550 nm. Kappa for the transmission fiber at 1600 nm is preferably between about 400 nm and 650 nm. Kappa, as used herein, is defined as the total dispersion of the fiber at the wavelength of interest divided by the dispersion slope of the fiber at that same wavelength. It should be understood that in the transmission system 19, the dispersion compensating fiber 20 compensates for accumulated build up of dispersion resulting from passing a light signal through the transmission fiber 19 (as indicated by arrow A). It should also be recognized that although the system 19 is described herein as being unidirectional, that transmission lines including the dispersion compensating fiber 20 described herein may have signals passing in both directions. The x's shown in FIG. 1 denote optical coupling, such as splices or connectors or any other optical connection.

In representative transmission systems 18, the accumulated dispersion of a representative 100 km length of the transmission fiber 19 (e.g., MDLDSF) is compensated for by a shorter length of dispersion compensating fiber 20, having a length of between about 4 to 9 km in accordance with an exemplary aspect of the invention. In other words, the compensation of the transmission fiber is accomplished by a dispersion compensating fiber 20 in accordance with the invention with a length of less than or equal to 9% of the length of the transmission fiber 19. The transmission system 18 may include a pre-amp 42 and power amp 44 or any other conventional amplifier arrangement. The system 18 may also include other conventional optical components such as a transmitter (T) 40 and receiver (R) 46. Optionally, the transmission system 18 may couple to one or more additional lengths of MDLDSF 19 or other transmission fiber instead of terminating at the receiver 46, i.e., the system may include multiple concatenated spans of fibers with amplifiers placed at spaced intervals. Further additional components such as filters, couplers, and amplifiers may also be included in the transmission system 18.

Dispersion compensating fibers 20 according to the invention have segmented core structures as best illustrated in FIGS. 2–8 including, preferably, a central core 22 surrounding and abutting the fiber's centerline having a positive delta % and a graded index shape, a moat 24 surrounding and abutting the central core 22 with a delta less than cladding, i.e., having a negative moat delta %, and a ring 26 surrounding the moat 24 and having a positive delta (all deltas being measured relative to the cladding 28 which surrounds and abuts the ring 26). Conventional protective polymer coating surrounds and abuts the cladding 28.

Figure 3:
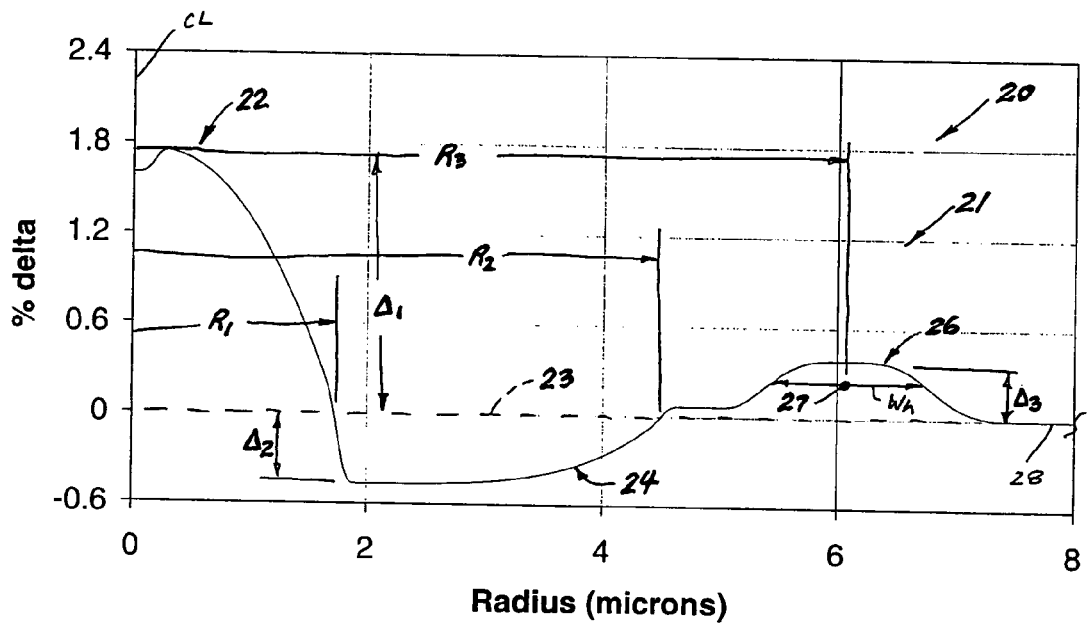
FIG. 3 is a graphic plot of relative refractive index of % delta vs. radius for a first embodiment of the dispersion compensating fiber in accordance with the present invention.
Figure 4:
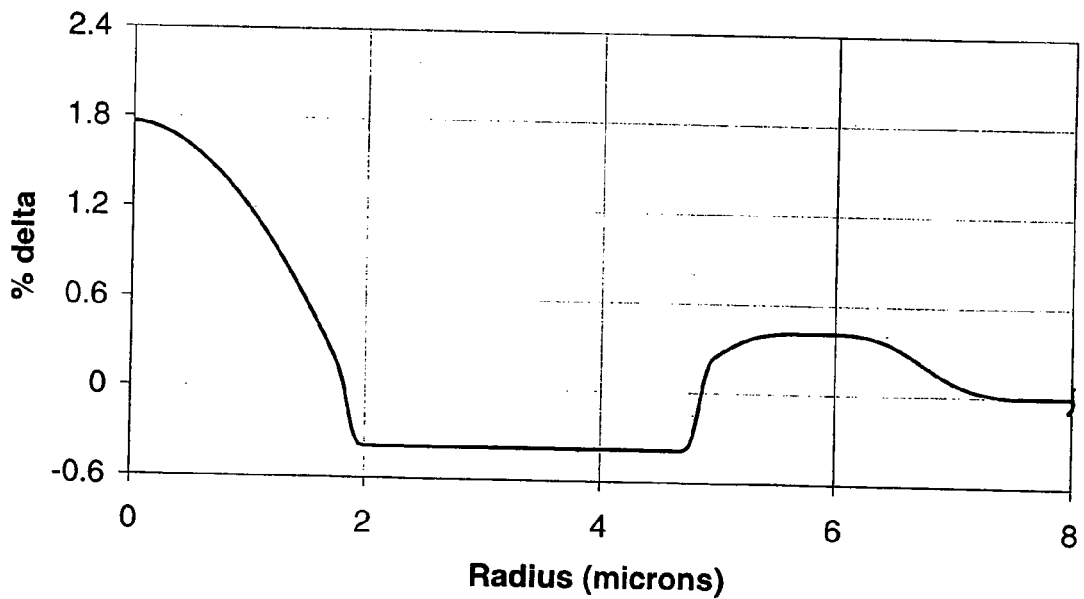
FIGS. 4–8 are graphic plots of refractive index profiles for additional embodiments of dispersion compensating fiber in accordance with the present invention.
Figure 5:
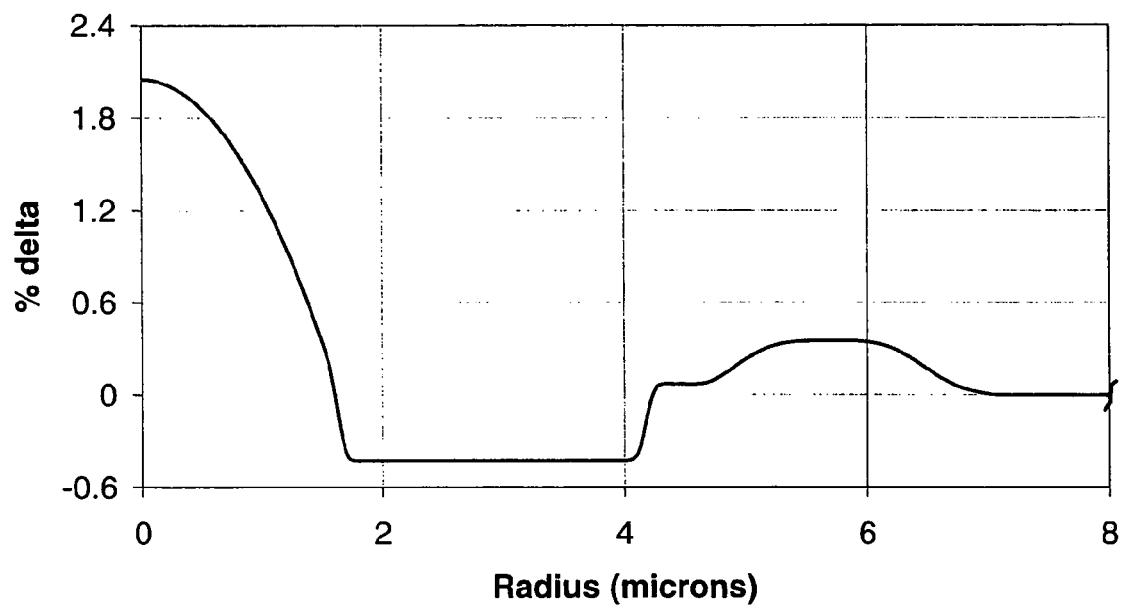
Figure 6:
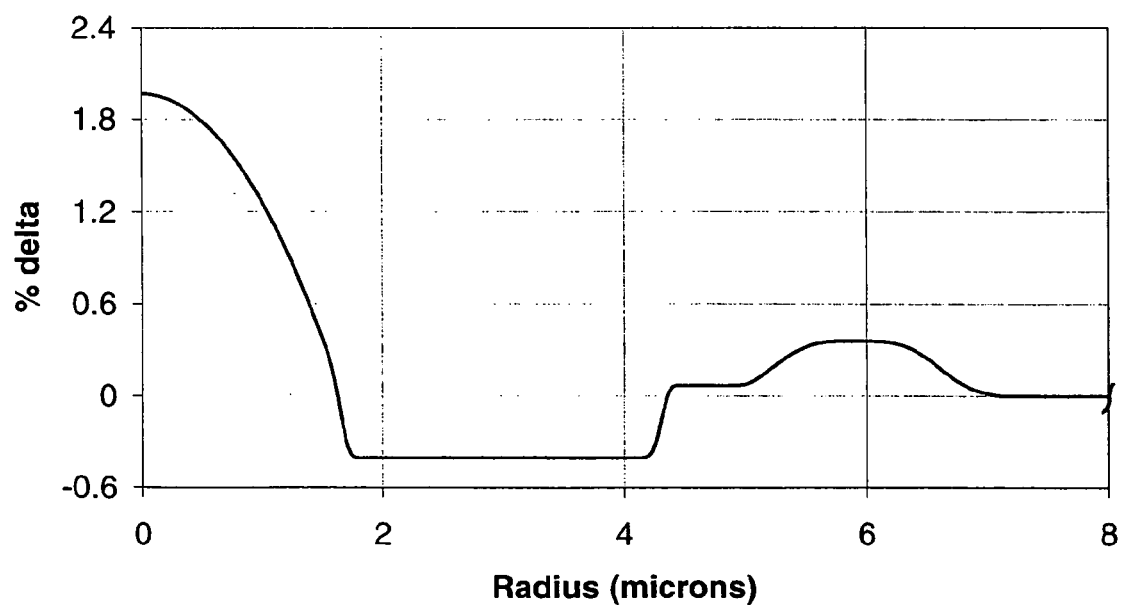

Now referring to FIG. 3, each of the fibers 20 in the family have a physical core 21 including a central core 22, a moat 24, and a ring 26. The conventions used in FIG. 3 to describe the radii and deltas apply equally for all embodiments shown herein and will not be repeated in each figure for clarity. The centermost segment is the central core 22 with a graded index shape having a positive maximum core delta (Δ1) of preferably greater than 1.5% and less than 2.5%, more preferably greater than 1.7%, and most preferably also less than 2.3%. The central core 22 preferably also has an alpha profile with an alpha (Δ) of between about 1.5 and 3.0; more preferably between 1.6 and 2.4.

Each of the fibers 20 in the family also preferably has a moat 24 surrounding and preferably abutting the central core 22 with a negative minimum moat delta (Δ2). Moat, as defined herein and generally understood is a core segment having a negative relative refractive index relative to the next radially adjacent outward segment. Moat delta (Δ2) is preferably more negative than −0.3%; more preferably between −0.35% and −0.5%.

Figure 7:
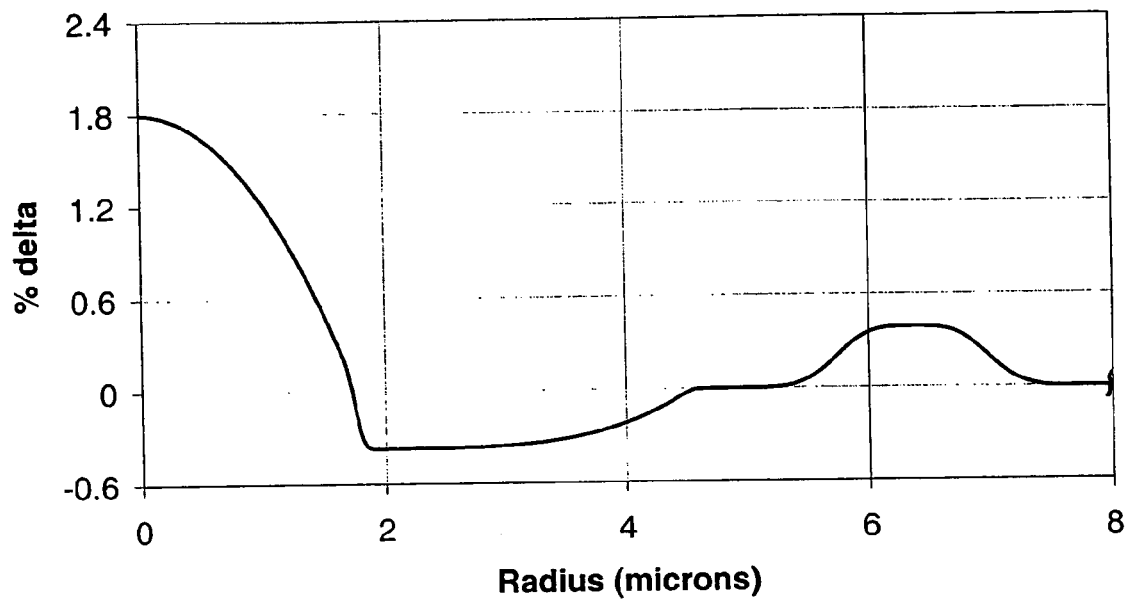
Figure 8:
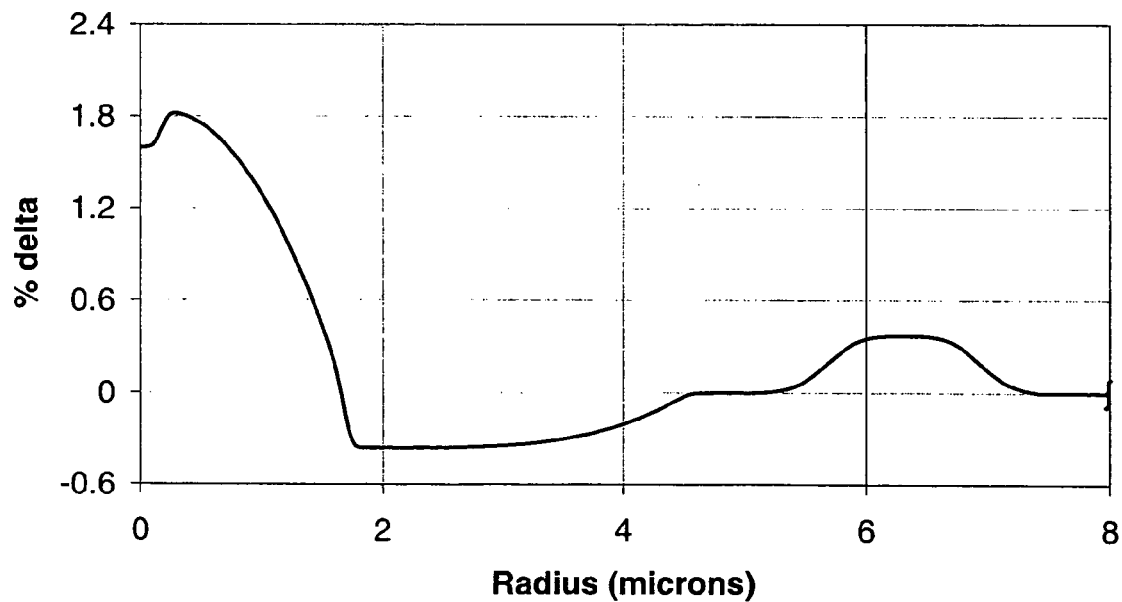

A ring 26 preferably surrounds the moat 24 in each of the fibers 20. Ring 26 preferably has a positive ring delta (Δ3) of between about 0.3% to 0.5%; more preferably between 0.34 and 0.42%. The ring 26 may directly abut the moat 24 as in the FIGS. 3–6 embodiments or be offset therefrom as shown in FIGS. 7 and 8. Cladding 28, preferably formed of pure silica, abuts the outer edge of the ring 26 and extends to the outermost diameter of the fiber. The cladding 28 may include other suitable dopants (such as fluorine) as well, provided that the desired refractive index profile is maintained. All delta % values herein are measured and reported relative to the index of cladding 28 and are measured relative to a hypothetical line 23, i.e., the so-called zero index line (shown dotted). The fiber 20 preferably has an outer diameter (outer diameter of the cladding) of about 125+/−3 microns. Each of the plots are shown truncated at 8 microns for clarity. Surrounding the cladding 28 is a suitable polymeric coating 30, such as, for example, a UV curable polymer. More preferably, the coating 30 is a conventional two-modulus protective polymer coating, such as a urethane acrylate. Preferably, the coating 30 exhibits a low-modulus primary coating, and a high-modulus outer secondary coating, as is known to those of skill in the art. The final coated diameter of the fiber is preferably about 250+/−6 microns.

The structure of the family of dispersion compensating fibers 20 in accordance with the invention are shown in FIGS. 3–8 and are listed in Table 1 below as examples 1–6. FIG. 3 illustrates the radii dimensions R1, R2, R3, the delta parameters Δ1, Δ2, and Δ3, the ring half width Wh (the width measured at half the ring delta Δ3/2).

For the family of dispersion compensating fibers 20 of FIGS. 3–8 according to the invention, the core radius (R1) of the central core 22 is preferably between about 1.5 and 2.0 microns; and more preferably between about 1.6 and 1.9 microns. In accordance with embodiments of the invention, the outer moat radius (R2) of the moat 24 is preferably between 4.0 and 5.0 microns from the fiber's centerline (CL). More preferably, the moat radius (R2) is between about 4.1 and 4.9 microns from the fiber's CL. The moat width is preferably between about 2.4 and 3.2 microns.

In accordance with further features of the invention, the refractive index profile of the family of dispersion compensating fibers 20 preferably includes a ring 26 having a ring radius (R3), as measured from the fibers centerline, CL, to the approximate center 27 of the ring 26, which is between about 5.5 and 6.5 microns; and more preferably between 5.6 and 6.4 microns. The ring 26 has a ring half width (Wh) which is preferably between about 0.8 to 1.5 microns; and more preferably between 1.0 and 1.4 microns.

The core-moat ratio (C-M Ratio) of the dispersion compensating fibers 20, defined as the outer radius (R1) to the outer edge of the central core 22 divided by the outer radius (R2) measured to the outer edge of the moat 24 (defined relative to the cladding reference 23), is preferably greater than 0.35 and less than 0.42; more preferably greater than 0.37 and less than 0.41. In certain embodiments of the invention, the effective area is preferably greater than or equal to 17 square microns at 1550 nm. In addition, the pin array bend loss at 1550 nm for the fibers remains less than 7 dB; more preferably less than 6 dB at 1550 nm.

The refractive index profile of the dispersion compensating fibers 20 is selected to provide certain optical properties in the $LP_{01}$ mode. All relevant properties are specified in the $LP_{01}$ mode, unless otherwise stated. In particular, the fibers 20 exhibit dispersion of less than −80 ps/nm/km at 1550 nm, while also exhibiting dispersion of less than −90 ps/nm/km at 1600 nm. More preferably, the dispersion is less than −80 ps/nm/km and greater than −130 ps/nm/km at 1550 nm, while also being less than −90 ps/nm/km at 1550 nm and greater than −145 ps/nm/km at 1600 nm. More preferably yet, the dispersion is less than −85 ps/nm/km and greater than −120 ps/nm/km at 1550 nm, and less than −90 ps/nm/km at 1550 nm and greater than −135 ps/nm/km at 1600 nm.

Dispersion slope for the family of dispersion compensating fibers 20 is preferably less than −0.18 ps/nm²/km at 1550 nm; more preferably between about −0.18 and −0.40 ps/nm²/km at 1550 nm; more preferably yet less than or equal to −0.19 and greater than or equal to −0.38 ps/nm²/km at 1550 nm; and most preferably less than −0.22 and greater than −0.37 ps/nm²/km at 1550 nm. The slope at 1660 nm is preferably less than −0.1 ps/nm²/km at 1600 nm; more preferably between about −0.2 and −0.45 ps/nm²/km at 1600 nm; and most preferably between about −0.22 and −0.44 ps/nm²/km at 1600 nm.

Figure 9:
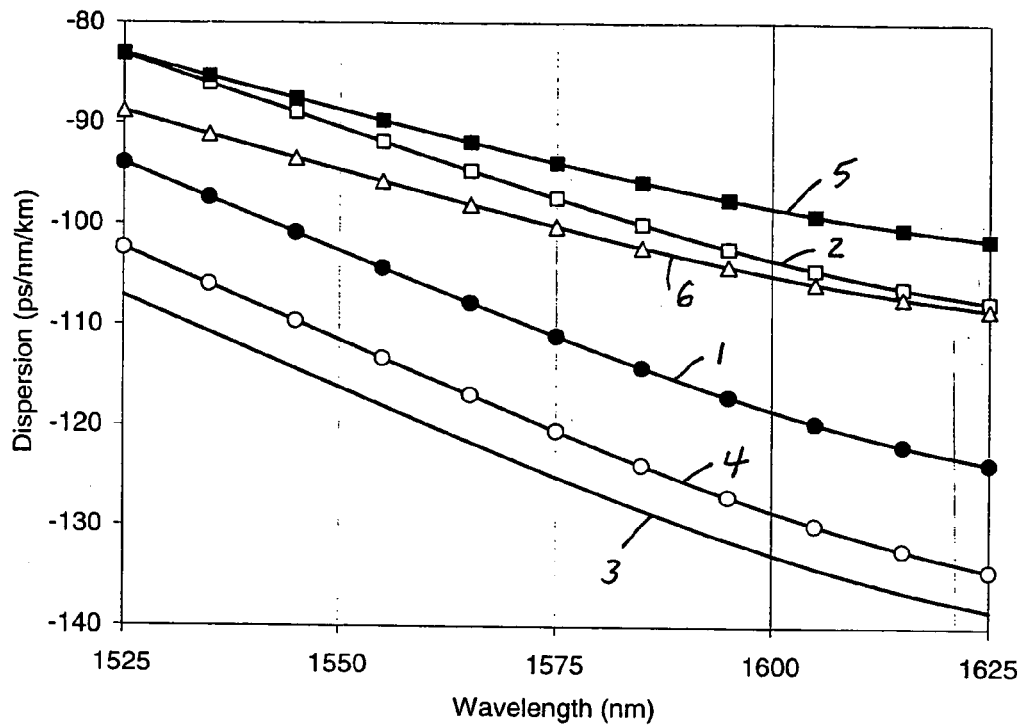
FIG. 9 is a graphic plot of dispersion vs. wavelength for the dispersion compensating fibers of FIGS. 3–8 in accordance with the present invention.
Figure 10:
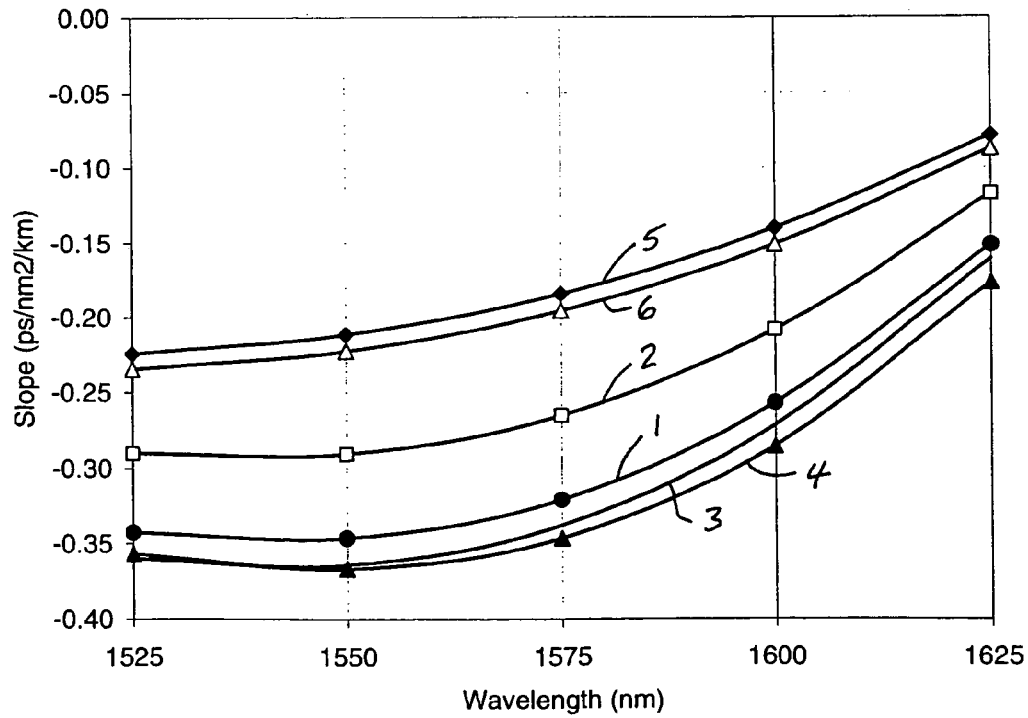
FIG. 10 is a graphic plot of dispersion slope vs. wavelength for the dispersion compensating fibers of FIGS. 3–8 in accordance with the present invention.
Figure 11:
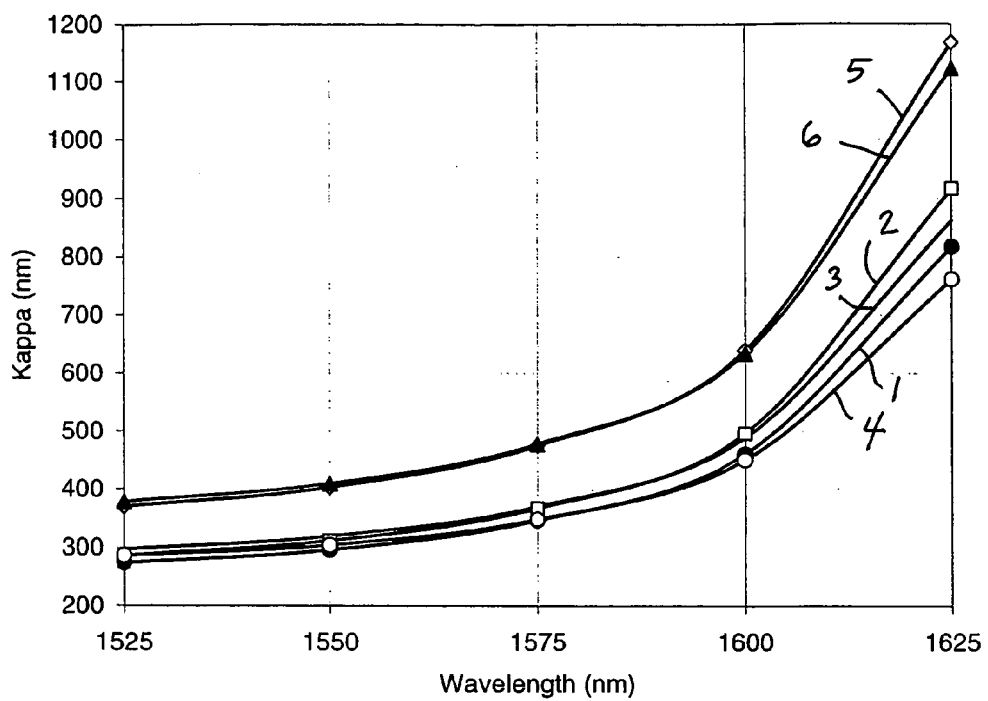
FIG. 11 is a graphic plot of kappa vs. wavelength for the dispersion compensating fibers of FIGS. 3–8 in accordance with the present invention.

Kappa at 1550 nm for the fiber 20 is preferably greater than 250 nm; more preferably greater than 250 nm and less than 450 nm; and most preferably between 290 nm and 430 nm. Kappa at 1600 nm is preferably greater than 390 nm; more preferably greater than 390 nm and less than 750 nm at 1600 mm; and most preferably between 440 nm and 680 nm at 1600 nm. The kappa ratio, defined herein as the kappa at 1600 nm divided by the kappa at 1550 nm, is preferably greater than 1.35; more preferably greater than 1.45; and most preferably between 1.45 and 1.65. Total dispersion, dispersion slope, and kappa plots are illustrated in FIGS. 9–11 for all the examples of dispersion compensating fibers 20 in accordance with the invention. FIG. 9 illustrates dispersion vs. wavelength for the fibers 20 across the C and L bands operating wavelength bands (1525 nm–1625 nm). Across the range, dispersion preferably lies in the range of between about −80 and −140 ps/nm/km for all wavelengths between 1525 and 1625 mm, for example, as shown in FIG. 9. Slope, as best shown in FIG. 10, preferably lies between 0.05 and −0.04 ps/nm²/km for all wavelengths between 1525 and 1625 nm, for example. Kappa preferably ranges between 200 and 1400 nm for all wavelengths between 1525 and 1625 nm, as best shown in FIG. 11. For each of FIGS. 9–11, the various plots are appropriately labeled with the example number (1–6) corresponding to the example fibers having the optical properties and structure as described in Table 1.

Figure 12:
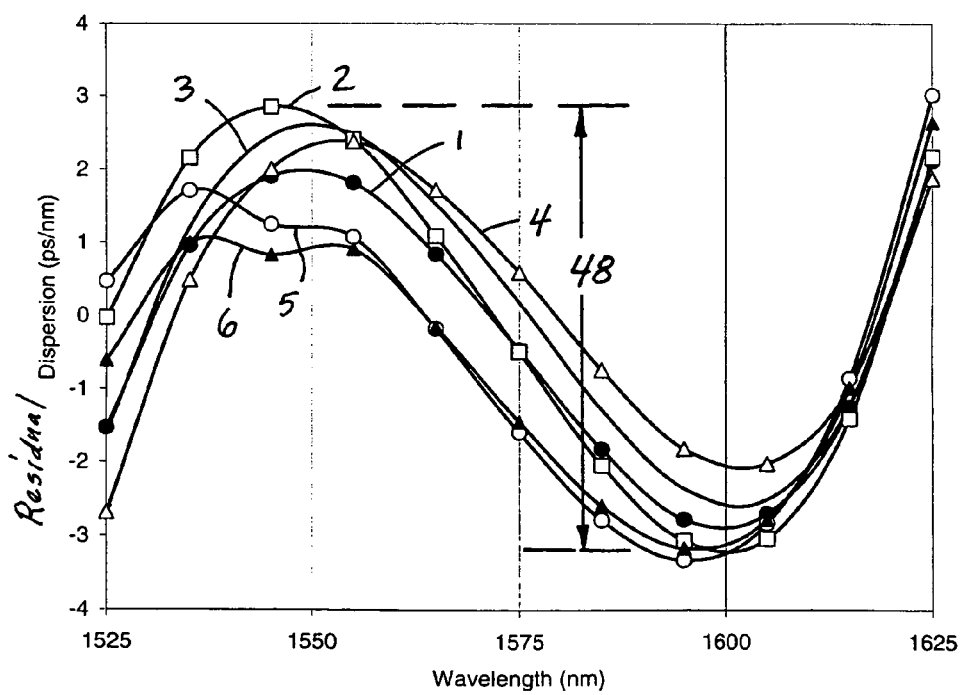
FIG. 12 is a graphic plot of average residual dispersion vs. wavelength for transmission systems including dispersion compensating fibers in accordance with the present invention.
Figure 18:
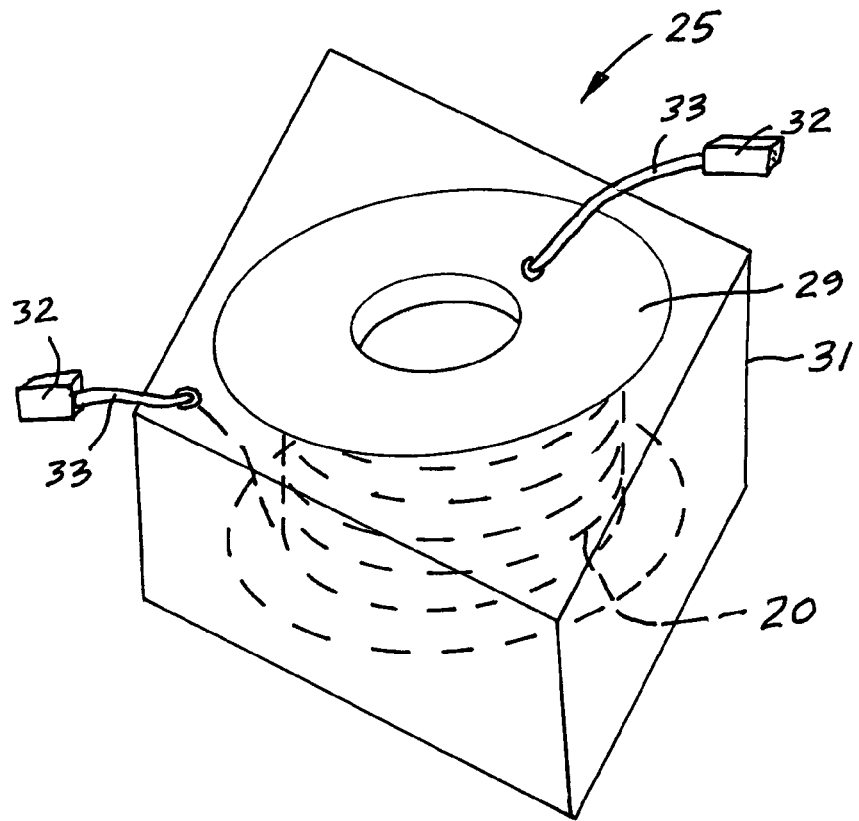
FIG. 18 is an isometric view of a dispersion compensating module including the dispersion compensating fiber in accordance with the invention.

By way of further clarification, the transmission system 18 (FIG. 1) includes a first section of transmission fiber 19, such as the MDLDSF described above, having a positive dispersion and positive dispersion slope within an operating wavelength band, and a dispersion compensating fiber 20 in accordance with the invention having a negative total dispersion and a negative dispersion slope within the operating wavelength band. The transmission system 18 described herein achieves very low average residual dispersions across the C−, L− and C+L bands, for example. FIG. 12 best illustrates average residual dispersion plots of various example transmission systems 18 including a representative embodiments of the present invention dispersion compensating fiber 20 optically coupled to various transmission fibers 19 as described herein. The dispersion compensating fibers 20 in accordance with embodiments of the invention are preferably formed as a plurality of coils of the fiber 20 within a conventional dispersion compensating module as shown in FIG. 18, for example. The module 25 preferably includes a spool 29 having a barrel and a plurality of flanges wherein multiple coils of the fiber 20 are wound about the barrel between the flanges until the desired length (e.g., preferably 4–9 km) is achieved. The spool 29 is preferably mounted to a housing 31. Preferably, standard single mode pigtails 33 and connectors 32 facilitate optical coupling and connection within the system, such as in the exemplary configuration shown in FIG. 1.

EXAMPLES

The present invention will be further clarified by the following examples summarized in Table 1 below. Table 1 includes optical attributes (such as Total Dispersion at 1550 and 1600 nm, Dispersion Slope at 1550 nm, Kappa at 1550 and 1600 nm, Kappa Ratio (KR) between kappa at 1550 nm and kappa at 1600 nm, Pin Array at 1550 nm, Lateral Load at 1550 nm, Effective Area at 1550 nm, and theoretical $LP_{02}$ cutoff wavelength) as well as refractive index structural parameters (Δ1, Δ2, Δ3, R1, R2, R3, Ro, Wh, and Core-Moat ratio) for the dispersion compensating fibers 20 in accordance with the invention. Examples 1–6 directly correspond to FIGS. 3–8, respectively.

TABLE 1

Examples - Dispersion Compensation Fiber

| Ex. | Dispersion (ps/nm/km) @ 1550 nm/ @ 1600 nm | Slope (ps/nm²/km) @ 1550 nm | Kappa (nm) @ 1550 nm/ @ 1600 nm | KR | Δ1 % | Δ2 % | Δ3 % | R1 (μm) | R2 (μm) | R3 (μm) |
|---|---|---|---|---|---|---|---|---|---|---|
| 1 | −103/−118 | −0.35 | 296/460 | 1.56 | 1.76 | −0.47 | 0.39 | 1.75 | 2.91 | 6.08 |
| 2 | −90/−103 | −0.29 | 311/496 | 1.59 | 1.77 | −0.39 | 0.41 | 1.86 | 3.19 | 5.83 |
| 3 | −116/−133 | −0.36 | 319/489 | 1.53 | 2.06 | −0.43 | 0.35 | 1.64 | 2.95 | 5.70 |
| 4 | −111/−128 | −0.37 | 304/450 | 1.48 | 1.97 | −0.41 | 0.36 | 1.67 | 2.84 | 5.92 |
| 5 | −89/−98 | −0.22 | 403/640 | 1.59 | 1.80 | −0.37 | 0.39 | 1.77 | 2.78 | 6.36 |
| 6 | −95/−105 | −0.23 | 409/634 | 1.55 | 1.83 | −0.36 | 0.37 | 1.69 | 2.71 | 6.31 |

TABLE 1-continued

Examples - Dispersion Compensation Fiber

| Ex. | Wh (μm) | C–M Ratio | Pin Array @ 1550 nm (dB) | Lat. Load @ 1550 nm dB/m | Aeff (μm²) | λcth (nm) |
|---|---|---|---|---|---|---|
| 1 | 1.16 | 0.39 | 2.7 | 0.19 | 18.2 | 1615 |
| 2 | 1.33 | 0.38 | 4.2 | 0.31 | 19.7 | 1617 |
| 3 | 1.31 | 0.39 | 2.9 | 0.15 | 17.0 | 1574 |
| 4 | 1.17 | 0.39 | 5.4 | 0.25 | 17.7 | 1568 |
| 5 | 1.01 | 0.39 | 1.4 | 0.10 | 18.9 | 1626 |
| 6 | 1.02 | 0.37 | 1.5 | 0.10 | 18.3 | 1610 |

TABLE 2

MDLSF data

| Attribute | Fiber A | Fiber B |
|---|---|---|
| Dispersion (ps/nm/km) @ 1550 nm | 5.16 | 7.06 |
| Dispersion (ps/nm/km) @ 1600 nm | 5.90 | 7.79 |
| Slope (ps/nm²/km) @ 1550 nm | 0.0173 | 0.0168 |
| Slope (ps/nm²/km) @ 1600 nm | 0.0130 | 0.0128 |
| Kappa (nm) @ 1550 nm | 299 | 421 |
| Kappa (nm) @ 1600 nm | 455 | 610 |
| Lambda Zero (nm) | 1383 | 1340 |

FIG. 12 illustrates plots for various systems 18 of modeled average residual dispersion over the C and L bands (1525 to 1625 nm). In each example transmission system 18, a representative length the dispersion compensating fiber 20 according to the invention is matched with and coupled to a 100 km length of the MDLDSF 19 of Table 2. Table 3 below illustrates further information for each system example.

TABLE 3

System Examples

| System # | Fiber 20 | Length Fiber 20 (km) | MDLDSF 19 | Length MDLDSF 19 (km) | Residual Dispersion (ps/nm) |
|---|---|---|---|---|---|
| 1 | 1 | 5.01 | Fiber A | 100 | <8 |
| 2 | 2 | 6.72 | Fiber A | 100 | <8 |
| 2 | 3 | 5.23 | Fiber A | 100 | <8 |
| 4 | 4 | 4.61 | Fiber A | 100 | <8 |
| 5 | 5 | 7.95 | Fiber B | 100 | <8 |
| 6 | 6 | 7.45 | Fiber B | 100 | <8 |

Figure 13:
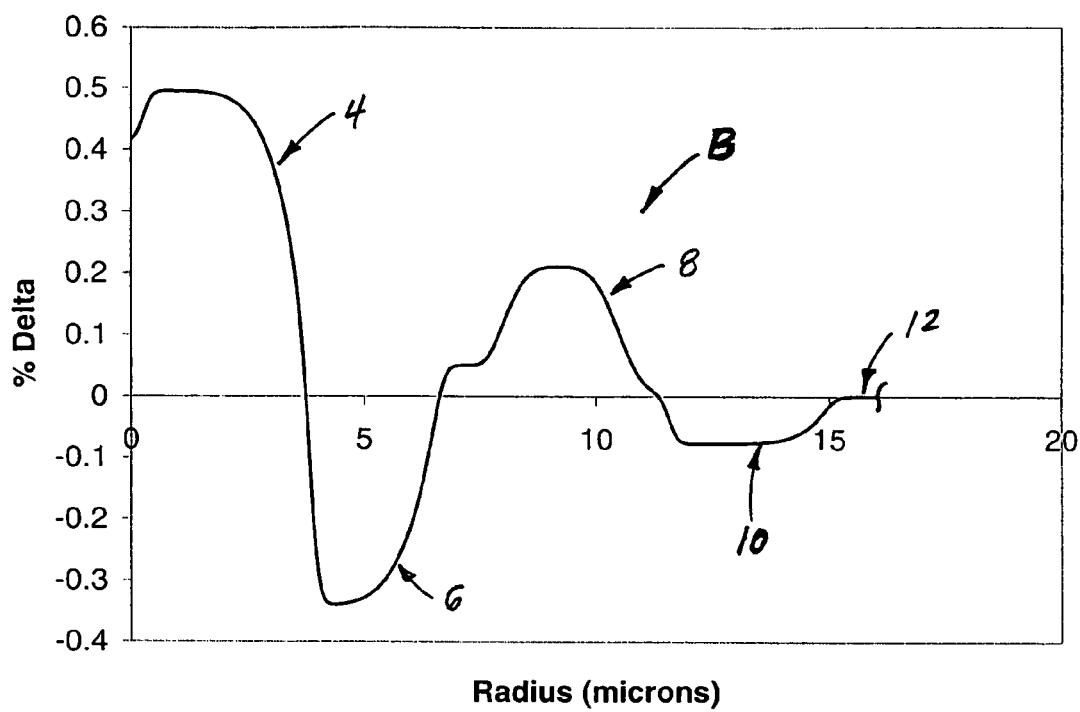
FIGS. 13 and 14 are refractive index plots of example MDLDSF to which the dispersion compensating fiber of the invention may be coupled.
Figure 14:
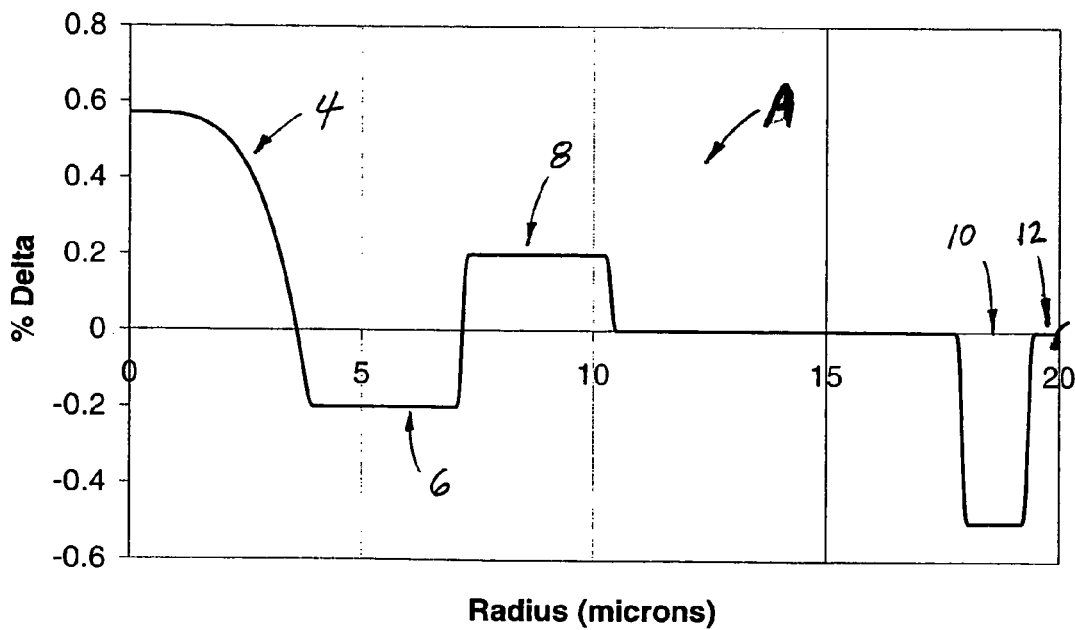

Example refractive index profile plots for examples A and B of the MDLDSF 19 are shown in FIGS. 14 and 13, respectively. As shown in FIG. 14, the transmission fiber 19 (Fiber A) preferably includes a central core 4, an annular moat region 6, a ring 8, and a gutter 10. Fiber A exhibits kappa at 1550 nm of about 300 nm. A more complete description of fiber A may be found in US Publication No. 2003/0021562, which is hereby incorporated by reference herein. Another fiber (Fiber B) preferably has a kappa at 1550 nm of about 420 nm. The core 4 and the ring 6 of Fiber A are preferably germanium doped and exhibit positive deltas relative to the cladding 12, whereas the moat 6 is preferably fluorine doped and preferably has a negative delta in comparison to the cladding 12. Further description of this transmission fiber B may be found in commonly assigned U.S. application Ser. No. 10/731,601 filed Dec. 9, 2003 entitled "Dispersion Flattened NZDSF Fiber," and U.S. Provisional Application No. 60/437,291 filed Dec. 31, 2002 entitled "Dispersion Flattened NZDSF Fiber," the disclosure of which is hereby incorporated by reference herein. As illustrated in FIG. 12, the modeled High-to-Low average residual dispersion 48 (shown for example 2) measured from the lowest to the highest residual dispersion value for the transmission line 18 is less than 8 ps/nm over the wavelength range from 1525 to 1625 nm per 100 km of the transmission fiber 19. For some system examples, the residual dispersion is less than 6 ps/nm over the wavelength range from 1525 to 1625 nm (see examples 1, 5, and 6) per 100 km of the transmission fiber 19.

Figure 15:
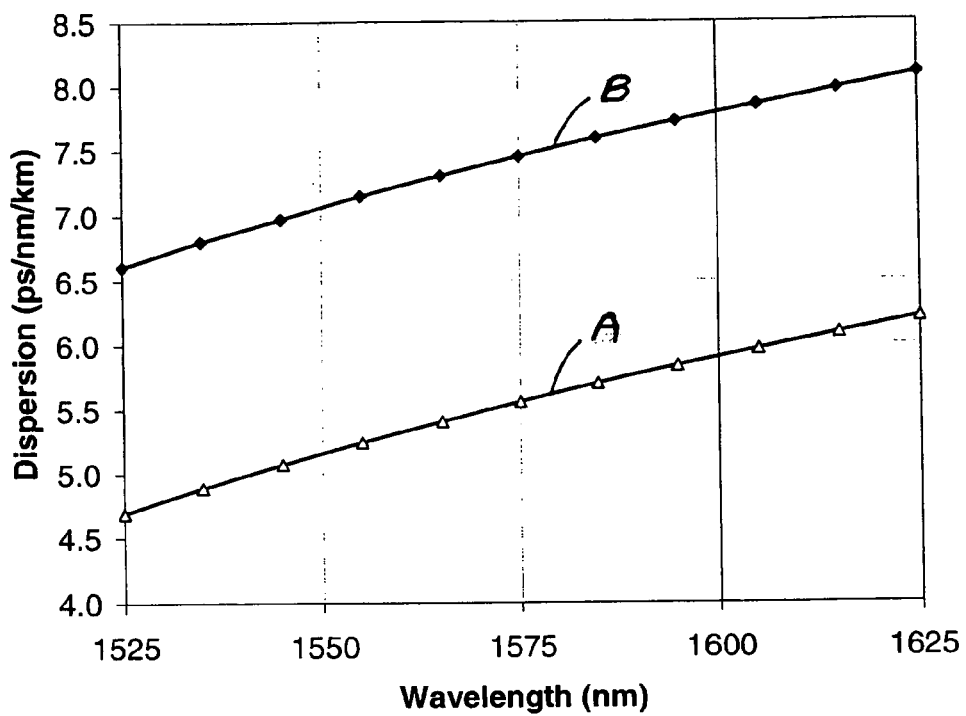
FIGS. 15–17 are plots of dispersion, kappa and slope vs. wavelength for the example MDLDSF of FIGS. 13 and 14, respectively.
Figure 16:
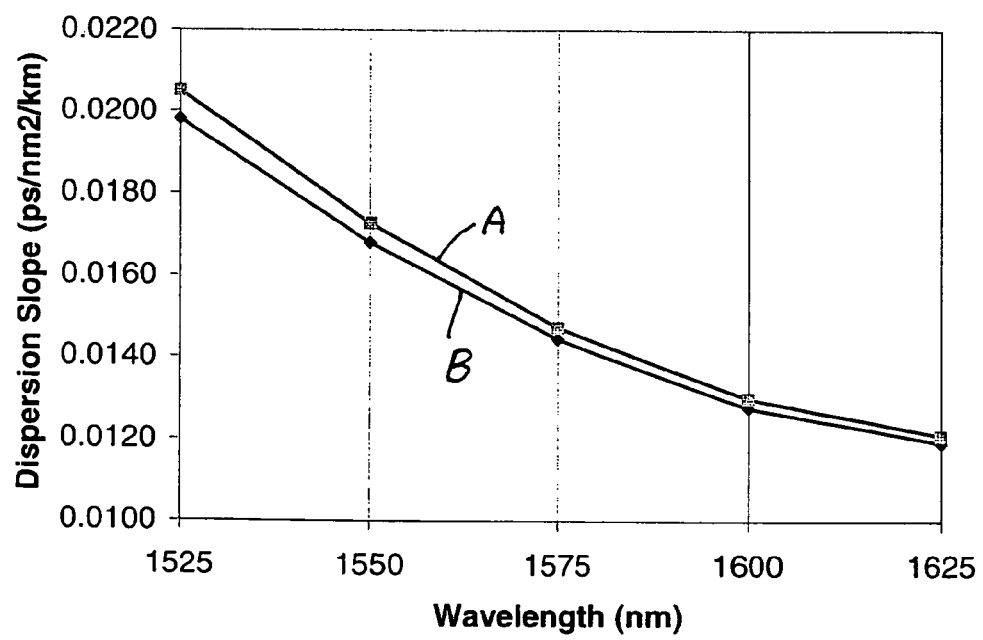
Figure 17:
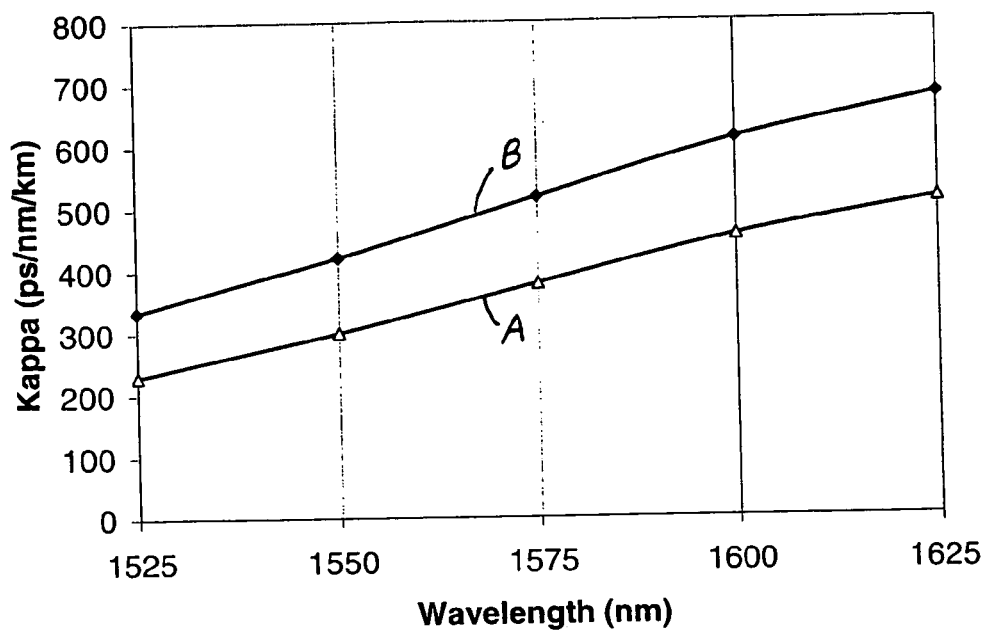

Thus, it should be apparent that in accordance with various further embodiments of the invention, transmission lines 18 including combinations of serially-coupled lengths of transmission fiber 19 and dispersion compensating fiber 20 provide excellent system dispersion compensation. The dispersion compensating fiber 20 is best coupled with transmission fiber 19 which preferably has a total dispersion ranging from 4 to 8 ps/nm/km at 1550 nm (see FIG. 15); and a dispersion slope preferably less than 0.025 ps/nm²/km at every wavelength between 1525 and 1625 nm (see FIG. 16). The transmission fiber 19 also preferably exhibits a zero dispersion wavelength less than 1400 nm, and an effective area of at lest 40 μm² at 1550 nm. Kappa for the transmission fiber 19 is preferably greater than 200 nm at 1550 nm; more preferably greater than 250 nm at 1550 nm; and in some embodiments greater than 300 nm at 1550 nm (See FIG. 17).

The dispersion compensating fibers 20 in accordance with them present invention may be drawn from optical fiber preforms utilizing conventional draw methods and apparatus. The optical fiber preform from which the present invention dispersion compensating fibers 20 are drawn may be manufactured in accordance with any known method, such as any known chemical vapor deposition method. Chemical vapor deposition methods include OVD, IVD, MCVD, PCVD or the like. Most preferably, the dispersion compensating fiber preform may be manufactured by an OVD method wherein the preform portion corresponding to the central core 22 is first manufactured by depositing silicon oxide soot doped with germanium oxide onto a rotating tapered alumina mandrel to a desired diameter. The soot is doped with the appropriate level of germanium dopant to achieve the desired refractive index profile for the central core segment 22 including the appropriate $\Delta_1\%$. The mandrel is then removed and the soot preform constituting the central core 22 is thoroughly dried in a preferably helium and chlorine containing environment and then consolidated in a consolidating furnace including a helium atmosphere. The consolidated central core blank is then redrawn into a single-segment core cane of about 9 to 11 mm in diameter. During the redraw process, the centerline aperture resulting from removal of the mandrel is closed through the application of a vacuum or by other known methods.

Redrawn single-segment core cane then becomes the target deposition surface for the application of further soot to form the preform portion corresponding to the moat 24. Silica soot is deposited onto the cane to an appropriate diameter for the moat and is then preferably dried within a consolidation furnace within a helium- and chlorine-containing atmosphere in a consolidation furnace. The soot preform is then doped with a suitable fluorine-containing gas, such as $C_2F_6$, $C_2F_2Cl_2$, $CF_4$, $SF_6$, or $SiF_4$, or the like, and subsequently consolidated and again redrawn into a two-segment core cane. U.S. Pat. No. 4,629,485 to Berkey describes one such method for fluorine doping an optical fiber preform.

This two-segment core cane material now becomes the deposition surface for the preform portion corresponding to the ring 26. Germanium-doped silica soot is next deposited on the two-segment cane and is subsequently dried and consolidated as herein before described. Again, the consolidated blank is redrawn and this time becomes the final core cane including three segments corresponding to the central core 22, moat 24, and ring 26 of the segmented physical core 21. Additional silica soot that comprises the cladding 28 is then deposited on the final core cane to form the overclad soot blank in one or more additional overclad steps. The overclad soot blank is dried and consolidated and subsequently transferred to a draw furnace where the present invention dispersion compensating fiber 20 is drawn therefrom in accordance with conventional draw methods.

It will be apparent to those skilled in the art that various modifications and variations can be made to the present invention without departing from the scope of the invention. Thus it is intended that the present invention cover the modifications and variations of this invention provided they come within the scope of the appended claims and their equivalents.

What is claimed is:

1. A dispersion compensation fiber, comprising:
   a refractive index profile including
   a central core having a positive core delta ($\Delta 1$) and an outer radius (R1),
   a moat surrounding the central core having a negative moat delta ($\Delta 2$) and a moat outer radius (R2), and
   a ring surrounding the moat having a positive ring delta ($\Delta 3$),
   wherein the refractive index profile is selected to provide
   total dispersion less than −80 ps/nm/km at 1550 nm and less than −90 ps/nm/km at 1600 nm,
   dispersion slope less than −0.18 ps/nm$^2$/km at 1550 nm and less than −0.1 ps/nm$^2$/km at 1600 nm, and
   kappa, defined as the total dispersion divided by the dispersion slope at a specific wavelength, at 1550 nm being greater than 250 nm and less than 450 nm, and at 1600 nm being greater than the kappa at 1550 nm, and
   kappa ratio, defined as kappa at 1600 nm divided by kappa at 1550 nm, greater than 1.35.

2. The fiber of claim 1 further comprising total dispersion less than −80 and greater than −130 ps/nm/km at 1550 nm.

3. The fiber of claim 1 further comprising total dispersion less than −90 and greater than −145 ps/nm/km at 1600 nm.

4. The fiber of claim 1 further comprising dispersion slope of between −0.18 and −0.40 ps/mm$^2$/km at 1550 nm.

5. The fiber of claim 1 further comprising dispersion slope of between −0.20 and −0.45 ps/nm$^2$/km at 1600 nm.

6. The dispersion compensation fiber of claim 1 further comprising kappa at 1550 nm of greater than 290 nm and less than 430 nm.

7. The dispersion compensation fiber of claim 1 further comprising kappa at 1600 nm of greater than 390 nm.

8. The dispersion compensation fiber of claim 1 wherein the kappa ratio is between 1.45 and 1.65.

9. The dispersion compensation fiber of claim 1 further comprising an effective area of greater than or equal to 17 square microns at 1550 nm.

10. The dispersion compensation fiber of claim 1 further comprising a pin array bend loss of less than 6 dB at 1550 nm.

11. The dispersion compensation fiber of claim 1 wherein the core-moat ratio, defined as an outer radius of the central core divided by an outer radius of the moat, is greater than 0.35 and less than 0.42.

12. The dispersion compensation fiber of claim 1 wherein the core delta ($\Delta 1$) is greater than 1.5%.

13. The dispersion compensation fiber of claim 12 wherein an outer core radius (R1) of the central core is between about 1.5 and 2.0 microns.

14. The dispersion compensation fiber of claim 1 wherein the moat delta ($\Delta 2$) is more negative than −0.3%.

15. The dispersion compensation fiber of claim 14 wherein the moat delta ($\Delta 2$) is between −0.35% and −0.5%.

16. The dispersion compensation fiber of claim 1 wherein the outer moat radius (R2) is between about 4.0 and 5.0 microns.

17. An optical transmission system, comprising:
   the dispersion compensation fiber of claim 1 optically coupled to a transmission fiber, the transmission fiber having:
   a total dispersion between 4 and 8 ps/nm/km at 1550 nm, and
   a positive dispersion slope less than 0.025 ps/nm$^2$/km for all wavelengths between 1525 and 1625 nm.

18. The optical transmission system of claim 17 wherein the transmission fiber comprises a kappa, defined as total dispersion at 1550 nm divided by dispersion slope at 1550 nm, of greater than 200 nm.

19. The optical transmission system of claim 17 wherein a High-to-Low residual dispersion for the transmission system over a wavelength band from 1525 nm to 1625 nm is less than 8 ps/nm per 100 km of the transmission fiber.

* * * * *